BEST AVAILABLE COPY
L. Heald,
Sarr-Mill Head-Block.
A.I No. 66.
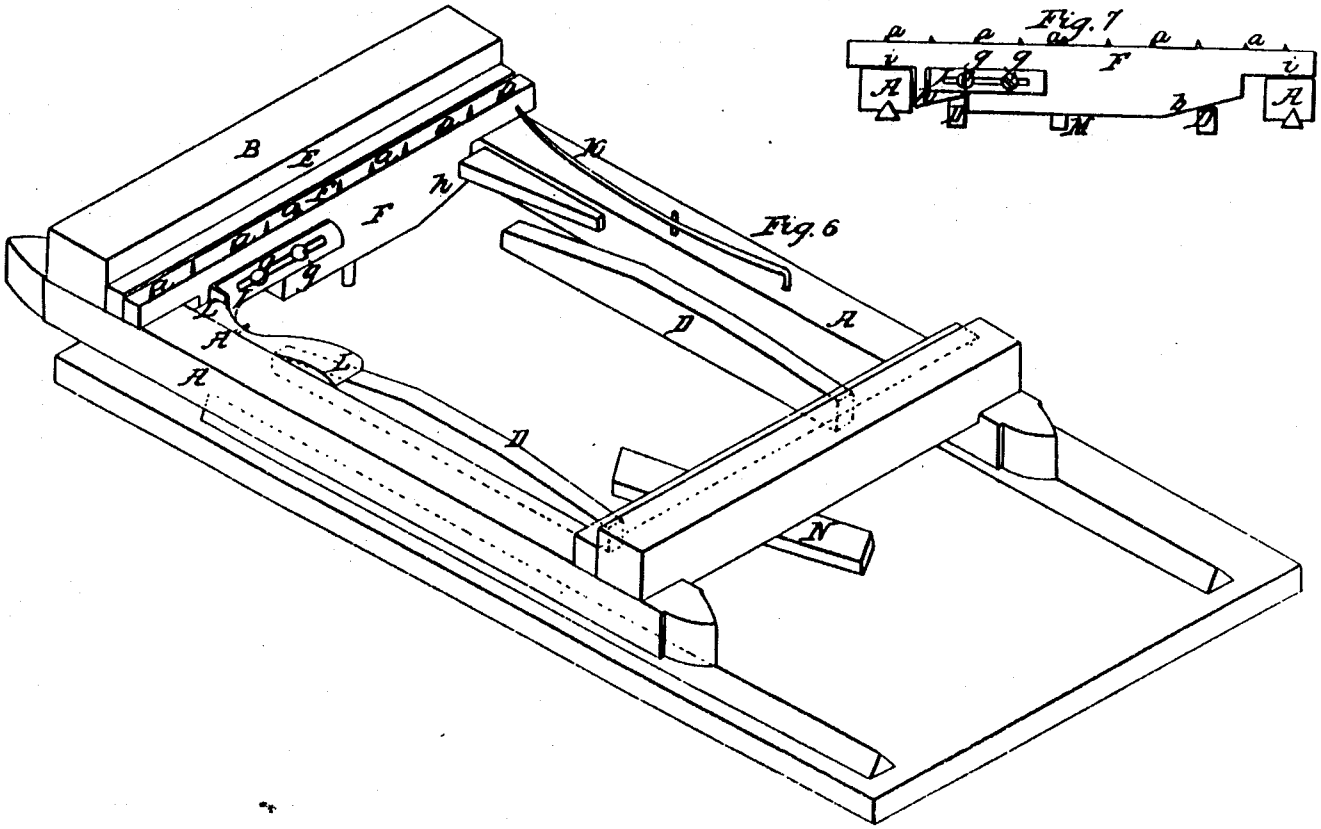
Patented Oct. 28, 1843.